US007603380B2

(12) United States Patent
Deffler

(10) Patent No.: US 7,603,380 B2
(45) Date of Patent: Oct. 13, 2009

(54) SYSTEM AND METHOD FOR MULTIPLE MODEL OBJECT SHARING

(75) Inventor: Tad A. Deffler, Boonton, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 753 days.

(21) Appl. No.: 10/887,734

(22) Filed: Jul. 9, 2004

(65) Prior Publication Data
US 2005/0119871 A1 Jun. 2, 2005

Related U.S. Application Data

(60) Provisional application No. 60/486,818, filed on Jul. 11, 2003.

(51) Int. Cl.
G06F 17/30 (2006.01)
G06F 17/00 (2006.01)
(52) U.S. Cl. ..................... 707/104.1; 707/100
(58) Field of Classification Search ............. 703/22; 717/216; 707/104, 100, 103, 104.1
See application file for complete search history.

(56) References Cited

U.S. PATENT DOCUMENTS

| 5,890,158 A | | 3/1999 | House et al. | |
|---|---|---|---|---|
| 5,893,059 A | * | 4/1999 | Raman | 704/256.2 |
| 5,969,967 A | | 10/1999 | Aahlad et al. | |
| 5,995,969 A | | 11/1999 | Lee et al. | |
| 6,477,435 B1 | * | 11/2002 | Ryan et al. | 700/86 |
| 6,854,642 B2 | * | 2/2005 | Metcalf et al. | 235/375 |
| 6,970,844 B1 | * | 11/2005 | Bierenbaum | 705/39 |
| 7,069,542 B2 | * | 6/2006 | Daly | 717/126 |
| 2003/0093435 A1 | * | 5/2003 | Bandekar | 707/103 R |
| 2004/0205587 A1 | * | 10/2004 | Draper | 715/513 |

OTHER PUBLICATIONS

"Sybase," Sybase PowerDesigner 9.5 Highlights, 2 pages, <http://www.sybase.com/detail/printthis/1,6907,1016578.00.html>, visited Jul. 26, 2004.
"Embarcadero Technologies", ER/Studio® Product Overview, Enterprise Data Modeling, pp. 1-4, © 1994-2003 <http://www.embarcadero.com/products/erstudio/erdatasheet.pdf>, visited Jul. 26, 2004.
Internatioanl Search Report issued in PCT/US2004/022245; Jan. 5, 2005; 7 pages.
Gerber, A., et al.; "Transformation: The Missing Link of MDA"; http://www.dstc.edu.au/Research/Projects/Pegamento/publications/icgt2002.pdf; pp. 1-16; retrieved on Dec. 20, 2004.

(Continued)

Primary Examiner—Charles Rones
Assistant Examiner—Fariborz Khoshnoodi
(74) Attorney, Agent, or Firm—Baker Botts L.L.P.

(57) ABSTRACT

A system and method for model object sharing are provided. In one embodiment, a method for model object sharing includes selecting a template object from a template model in a modeling repository. The template model was generated by a first modeling tool. A copy of the template object is generated. The copy is converted to a form compatible with a second modeling tool. The copy is then associated with the selected template object.

22 Claims, 2 Drawing Sheets

OTHER PUBLICATIONS

Duddy, K., et al., "MOF Query/Views/Transformations, Initial Submission"; OMG Document AD-2003-02-03; http://www.omg.org/docs/ad/03-02-03.pdf; pp. 1-66; retrieved on Dec. 20, 2004.

Novell; "Introduction to DirXML"; Novell Tutorial; http://developer.novell.com/education/tutorials/introdirxml/introDirXML.pdf; pp. 1-116; retrieved on Dec. 6, 2004.

Born, M., et al.; "Assessment of the Model Driven Technologies—Foundations and Key Technologies"; http://www.modatel.org/~Modatel/pub/deliverables/D2.1-final.pdf; pp. 1-71; retrieved on Dec. 13, 2004.

OMG; "MOF 2.0 Query/Views/Transformations RFP"; OMG Request for Proposals; Apr. 25, 2002; pp. 1-32.

EPO Communication pursuant to Article 94(3) EPC; Application No. 04/777 994.7-1225; Ref. HCD / J00048525EP, Jan. 28, 2009.

\* cited by examiner

SYSTEM AND METHOD FOR MULTIPLE MODEL OBJECT SHARING

RELATED APPLICATION

This application claims the priority under 35 U.S.C. §119 of provisional application Ser. No. 60/486,818 filed Jul. 11, 2003.

TECHNICAL FIELD

This disclosure relates generally to the field of modeling and, more particularly, to a system and method for multiple model object sharing.

BACKGROUND

Complex systems are often developed and analyzed by modeling systems including multiple modeling tools. Each modeling tool allows developers of the complex system to focus on various aspects or implementations of the complex system. Modeling systems may generate modeling templates for exchanging models created by disparate modeling tools. Traditionally, these modeling templates often include objects that are commonly shared among modeling tools.

SUMMARY

A system and method for multiple model object sharing are provided. In one embodiment, a method for model object sharing includes selecting a template object from a template model in a modeling repository. The template model was generated by a first modeling tool. A copy of the template object is generated. The copy is converted to a form compatible with a second modeling tool and associated with the selected template object. The details of one or more embodiments of the disclosure are set forth in the accompanying drawings and the description below. Particular features, objects, and advantages of the disclosure will be apparent from the description and drawings and from the claims.

DESCRIPTION OF EXAMPLE EMBODIMENTS

Figure 1:
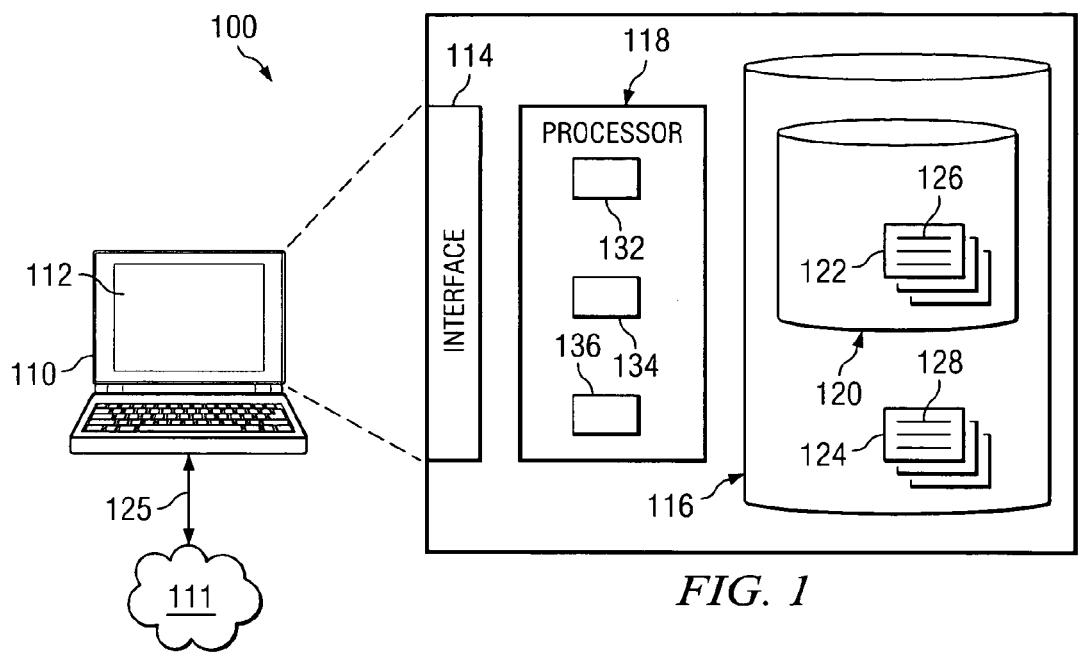
FIG. 1 is a block diagram illustrating an exemplary modeling system for providing template objects in accordance with one embodiment of the present invention.

FIG. 1 illustrates one embodiment of a system 100 for multiple model object sharing. System 100 is any system that converts objects to forms compatible with disparate modeling tools and/or manages change propagation among the various models and modeling tools. This configuration may reduce, minimize, or eliminate uncontrolled propagation of changes among modeling tools. At a high level, system 100 includes at least a single computer 110, but system 100 may also be any portion of a distributed system including a network 111. In general, system 100 may comprise a portion of an information management system or enterprise network that provides a number of software applications to any number of clients. Alternatively, or in combination, system 100 may include a client (such as computer 110) requesting template objects from an information management system or enterprise network via a number of software applications.

Illustrated computer 110 includes a graphical user interface (GUI) 112, network interface 114, memory 116, and processor 118. FIG. 1 only provides one example of a computer that may be used with the disclosure. The present disclosure contemplates computers other than general purpose computers as well as computers without conventional operation systems. As used in this document, the term "computer" is intended to encompass a mainframe, a personal computer, a client, a server, a workstation, a network computer, a personal digital assistant, a mobile phone, or any other suitable processing device. Computer 110 is typically operable to receive input from and display output through GUI 112.

GUI 112 comprises a graphical user interface operable to allow the user of computer 110 to interact with processor 118. The term "computer 110" and the phrase "user of computer 110" may be used interchangeably, where appropriate, without departing from the scope of this disclosure. Generally, GUI 112 provides the user of computer 110 with an efficient and user-friendly presentation of data provided by computer 110. GUI 112 may comprise a plurality of displays having interactive fields, pull-down lists, and buttons operated by the user. And in one example, GUI 112 presents an explore-type interface and receives commands from the user. It should be understood that the term graphical user interface may be used in the singular or in the plural to describe one or more graphical user interfaces in each of the displays of a particular graphical user interface. Further, GUI 112 contemplates any graphical user interface, such as a generic web browser, that processes information in computer 110 and efficiently presents the information to the user. Network 111 can accept data from the user of computer 110 via the web browser (e.g., Microsoft Internet Explorer or Netscape Navigator) and return the appropriate HTML or extensible Markup Language (XML) responses.

Computer 110 may include a network interface 114 for communicating with other computer systems over network 111 such as, for example, in a client-server or other distributed environment via link 125. In certain embodiments, computer 110 may generate requests and/or responses and communicate them to a client, server, or other computer systems or components located in or communicably coupled with network 111. Network 111 facilitates wireless or wireline communication between computer system 100 and any other computer. Network 111 may communicate, for example, Internet Protocol (IP) packets, Frame Relay frames, Asynchronous Transfer Mode (ATM) cells, voice, video, data, and other suitable information between network addresses. Network 111 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 114 comprises logic encoded in software and/or hardware in any suitable combination to allow computer 110 to communicate with network 111 via link 125. More specifically, interface 114 may comprise software supporting one or more communications protocols associated with link 125 and communications.

Memory 116 may include any memory or database module and may take the form of volatile or non-volatile memory including, without limitation, magnetic media, optical media, Random Access Memory (RAM), Read Only Memory (ROM), removable media, or any other suitable local or remote memory component. In the illustrated embodiment, memory 116 includes a modeling repository 120 and one or more target models 124. Repository 120 comprises any storage media for the storage and retrieval of information. According to one embodiment, repository 120 comprises a relational database normally accessed through Structured Query Language (SQL) statements. Relational databases use sets of schemas to describe the tables, columns and relationships in the tables using basic principles known in the field of database design. Alternatively or in combination, repository 120 may store extensible Markup Language (XML) documents, flat files, Btrieve files, name-value-pair, and/or comma-separated-value (CSV) files. In the illustrated embodiment, repository 120 includes or references one or more template models 122, but may include any other data as appropriate.

Template model 122 comprises rules, instructions, algorithms, or other directives used by computer 110 to describe a model associated with or compatible with a first modeling tool. For example, the described model may represent a logical object-oriented model of a software system or metamodel. In another example, the described model may represent a relativistic hot dense plasma. Template model 122 may be any suitable format such as, for example, an XML document, a flat file, CSV file, a name-value pair file, SQL table, or others. For example, template model 122 may be generated in XML Metadata Interchange (XMI) based on the Unified Modeling Language (UML). Template model 122 may include a globally-unique identifier (GUID), a name, or any other suitable data structure for uniquely identifying each template model 122. Further, the included identifier, hereinafter referred to as GUID, may be operable to identify a version of model template 122, thereby providing easy determinations of relationships with other versions in time. For example, the GUID may comprise a monotonically-increasing integer or, alternatively, any other suitable ordered unique identifier for determining relationships with other versions in time. Template model 122 may be dynamically created by computer 110, a third-party vendor, or any user of computer 110, as well as dynamically loaded from a default file or received via network 111. The term "dynamically" as used herein, generally means that the appropriate processing is determined at runtime based upon the appropriate information. Moreover, template model 122 may be accessed one or more times over a period of a day, a week, or any time by disparate modeling tools so long as it provides one or more template objects 126 upon request.

Template model 122 includes one or more entries of instructions, namely template object 126, which identifies at least one feature and/or function of the associated model. Generally, template object 126 may include data associated with the particular model and procedures to manipulate the data. For example, template object 126 may include domains, User Datagram Protocol (UDP) definitions, validation rules, trigger templates, Oracle E/R definitions, or other suitable objects. The included data may be of any appropriate data type, including float, integer, currency, date, decimal, string, or any other numeric or non-numeric format operable to identify at least one feature and/or function of the model described in or association with template model 122. The procedures may comprise a mathematical and/or logical expression based on any appropriate programming language such as, for example, C, C++, Java, Pearl, or any other suitable programming language. For example, template object 126 may comprise an algebraic, trigonometric, logarithmic, exponential, a combination of the foregoing, or any other suitable mathematical expression. In one embodiment, template object 126 is associated with an object identifier, such as an integer that uniquely identifiers template object 126.

At least partially based on template object 126, target model 124 comprises rules, instructions, algorithms, or any other directive used by computer 110 to describe a model associated or compatible with a second modeling tool, which is at least partially disparate from the first modeling tool associated with template model 122. Target model 124 may be any suitable format such as, for example, an XML document, a flat file, CSV file, a name-value pair file, SQL table, or others. For example, target model 124 may be generated in XMI based on UML. Target model 124 may include a tag that identifies a property associating target model 124 to a version of template object 126. In one embodiment, the tag includes a GUID of template model 122, a version of template model 122, and an identifier of template object 126 and may comprise the following form:

<GUID>/<Model Version>/<Object Identifier>.

For example, the tag may include an alphanumeric GUID, a version identifier of 2, and an object identifier of 197 such that the tag is as followed:

886972F9F8984945B6AE367B48334204/2/197.

The above format and example are for illustration purposes only. The tag may comprise any suitable string or data structure operable to identify a version of associated template object 126 in template model 122. Target model 124 may be dynamically created by computer 110, a third-party vendor, any suitable user of computer 110, loaded from a default file, or received via network 111. Moreover, target model 124 may be accessed one or more times over a period of a day, a week, or any time by disparate modeling tools so long as it may includes target object 128.

Target object 128 comprises one or more entries or instructions in target model 124 that identifies at least one feature and/or function of the described model. Generally, target object 128 may include data associated with the described model and procedures to manipulate the data. For example, target object 128 may include domains, UDP definitions, validation rules, trigger templates, Oracle E/R definitions, or other suitable objects. The included data may comprise any appropriate data type, including float, integer, currency, date, decimal, string, or any other numeric or non-numeric format operable to identify at least one feature and/or function of the model described in target model 124. The procedures may comprise a mathematical and/or logical expression based on any appropriate programming language such as, for example, C, C++, Java, Pearl, or any other suitable programming language. For example, target object 128 may comprise an algebraic, trigonometric, logarithmic, exponential, a combination of the foregoing, or any suitable mathematical expression.

Processor 118 executes instructions and manipulates data to perform operations of computer 110. Although FIG. 1 illustrates a single processor 118 in computer 110, multiple processors 118 may be used according to particular needs, and referenced to processor 118 is meant to include multiple processors 118 where appropriate. In the illustrated embodiment, processor 118 includes template modeling tool 132, export engine 134, and target modeling tool 136. Regarding the illustrated embodiment, template modeling tool 132 generates template model 122 including template object 126 for use with one or more target modeling tools 136. Template modeling tool 132 may include any hardware, software, firmware, or combination thereof operable. It will be understood that while template modeling tool 132 is illustrated as a single multi-tasked module, the features and functionality performed by this engine may be performed by multiple modules. Moreover, template modeling tool 132 may comprise a child or submodule of another software module without departing from the scope of this disclosure. In short, template modeling tool 132 generates template object 126 that is accessible by export engine 134.

Target modeling tool 136 is any modeling tool, application, module, library, or object operable to generate or use models. Generally target modeling tool 136 is a second modeling tool at least partially dissimilar or disparate from template modeling tool 132. For example, template modeling tool 132 may be a different version of the same application as target modeling tool 136. In another example, modeling tools 132 and 136 may be different software applications. Target modeling tool 136 generates target model 124 based, at least in part, on the copy of template object 128. Target modeling tool 136 includes any suitable hardware, software, firmware, or combination thereof operable to communicate a request for template object 128 to export engine 134, receive a copy of template object 128 in a form compatible with target modeling tool 136, and generate and/or update target model 124 including the copy. In one embodiment, target modeling tool 136 tags target model 124 with the properties described above. It will be understood that while target modeling tool 136 is illustrated as a single multi-tasked module, the features and functionality performed by this engine may be performed by multiple modules. Moreover, target modeling tool 136 may comprise a child or submodule of another software module, not illustrated, without departing from the scope of this disclosure.

When initially generating target model 124, target modeling tool 136 may communicate a request for a copy of template object 128. After receiving a copy of template object 128 in a compatible form, target modeling tool 136 generates target model 124 based, at least in part, on the copy. Further, target modeling tool 136 may be operable to receive updates to target object 128 based on changes to template object 126. In one embodiment, target modeling tool 136 receives updates to target object 128 in response to a request for updates communicated from target modeling tool 136 to export engine 134. This request may be generated in response to an event such as, for example, loading target model 124 or, alternatively, any other suitable event. In another embodiment, target modeling tool 136 automatically receives updates to target object 128 from export engine 134.

Export engine 134 converts a copy of one or more template objects 126 to a form at least partially compatible with target modeling tool 136. Generally, export engine 134 includes any suitable hardware, software, firmware, or combination thereof operable to receive requests for template object 126, locate associated target objects 128, copy template object 126, convert the copy of template object 126 to a form compatible with target modeling tool 136, and update target object 128. As used herein, convert means to swap, translate, transition, or otherwise modify one or more values or formats. It will be understood that while export engine 134 is illustrated as a single multi-tasked module, the features and functionality performed by this engine may be performed by multiple modules. Moreover, export engine 134 may comprise a child or submodule of another software module, not illustrated, without departing from the scope of this disclosure. Further, export engine 134 may be included in, or communicably coupled with, template modeling tool 132 or target modeling tool 136 without departing from the scope of this disclosure.

Export engine 134 may receive an initial request for template object 126 from target modeling tool 136. In this case, export engine 134 generates a copy of template object 126 and converts the copy to a form compatible with target modeling tool 136. Once converted, export engine 134 provides target modeling tool 136 with the copy in order to initially generate target model 124. After target model 124 is generated, export engine 134 may receive request to update target object 128 from template modeling tool 132, target modeling tool 136, or any other suitable source. In response to a request from target modeling tool 136, export engine 134 checks for any unpropagated changes to template object 126 for propagating any discovered changes. In response to a request from template modeling tool 132, export engine 134 locates one or more converted copies of template object 126 for automatically updating the one or more converted copies. Export engine 134 may locate the converted copies based on the tags described above. The term "automatically," as used herein, generally means that the appropriate processing is substantially performed by system 100. In either case, export engine 134 copies template object 126. After generating the copy of template object 126, export engine 134 converts the copy to a form compatible with target modeling tool 136. For example, export engine 134 may modify the copy of template object 126, combined one or more template objects 126, or otherwise alter template object 126. Alternatively, copying template object 126 may sufficiently satisfy the conversion process such that the copy is in a form compatible with target modeling tool 136. Once the copy is in a compatible form, export engine 134, in one embodiment, updates target model 124 with the converted copy. In another embodiment, export engine 134 provides the converted copy to target modeling tool 136.

In one aspect of operation, template modeling tool 132 generates template model 122. Once the one or more template objects 126 are generated, target modeling tool 136 communicates a request to export engine 134. In response to the request, export engine 134 copies template object 126 and converts the copy to a form compatible with target modeling tool 136. Based, at least in part, on the converted copy, target modeling tool 136 generates or references target model 124 including target objects 128. For example, target model 124 may include the converted copies. In another example, target model 124 may include objects 128 generated based on the copies. In response to changes to template object 126, template modeling tool 132 invokes export engine 134 to locate target objects 128 based on template object 126 and updates the located target objects 128 based on the changes to template object 126.

Figure 2:
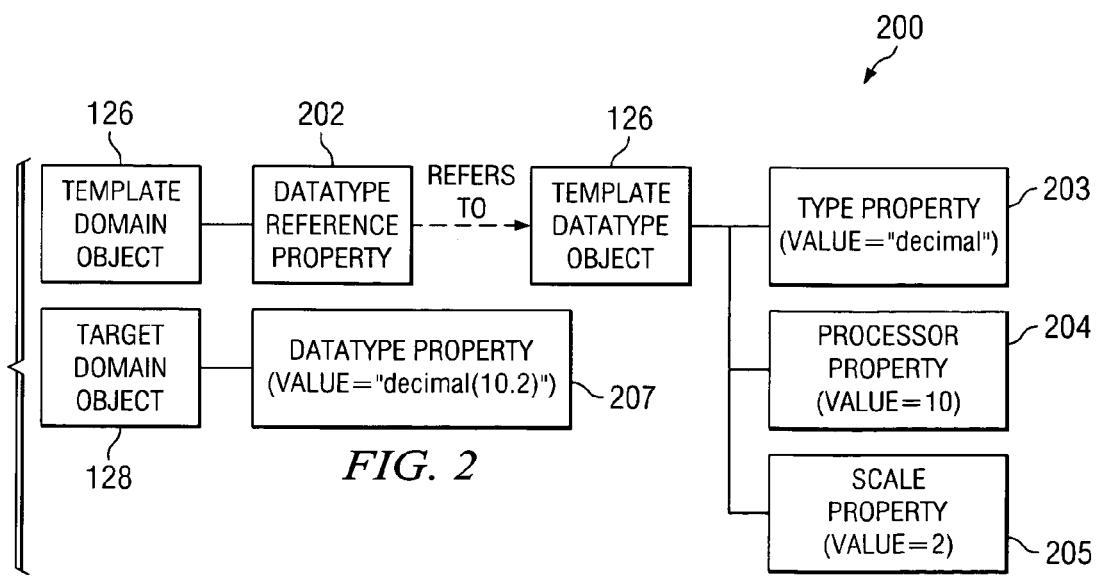
FIG. 2 illustrates an example object schema in accordance with the modeling system illustrated in FIG. 1.

FIG. 2 illustrates one embodiment of an object schema 200 that may be processed by system 100. Referring to FIG. 2, object schema 200 includes template domain object 126, template datatype object 126, and target domain object 128 in accordance with system 100 of FIG. 1. In particular, template domain object 126 and template datatype object 126 are copied and converted to target domain object 128 thereby being compatible with target modeling tool 136.

In the illustrated embodiment, template domain object 126 includes a datatype reference property 202 associating template domain object 126 with template datatype object 126. Template datatype object 126 includes type property 203, precision property 204, and scale property 205 that identify the properties of template domain object 126. Type property 203, in one embodiment, identifies that template domain object 126 comprises a decimal. Precision property 204, in one example, identifies template domain object 126 as having a precision of 10. Scale property 205, in one example, identifies template domain object 126 as having a scale of 2. Based on template domain object 126 and template datatype object 126, export engine converts these template objects 126 to target domain object 128 which is compatible with target modeling tool 136. According to the illustrated example, the datatype of target domain object 128 is stored as datatype property 207, a string property as a part of target domain object 128. The value of datatype property 207, according to this example, is "decimal(10,2)." It will be understood that the various components of the illustrated schema 200 may be combined or omitted, additional components may be added according to particular needs, and such components may comprise multiple components without departing from the scope of this disclosure. Additionally, the illustrated schema may be implemented using system 100 of FIG. 1. It will be understood that schema 200 is only an example and other features and functions may be implemented without varying from the scope of this disclosure.

Figure 3:
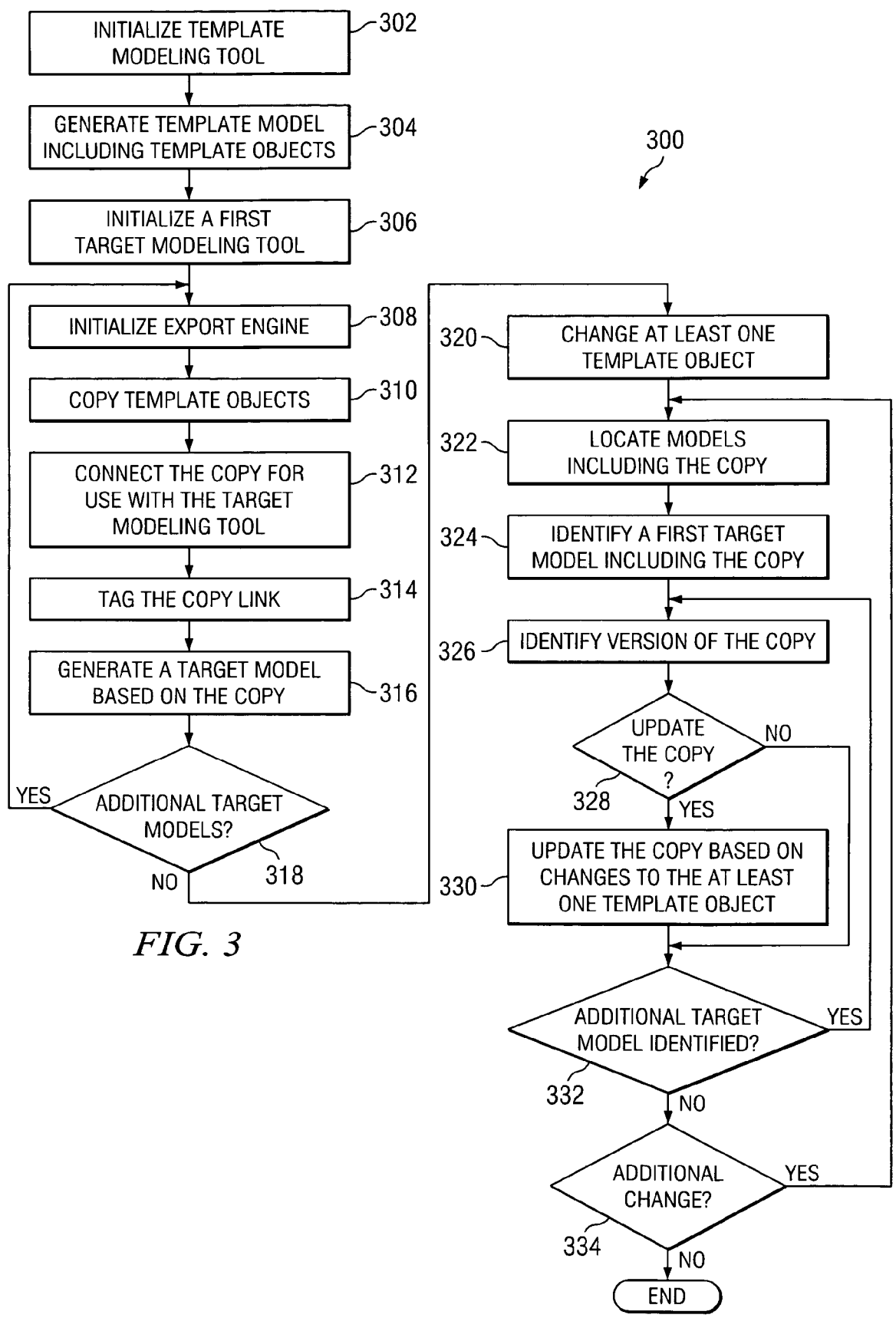
FIG. 3 is an exemplary flow diagram illustrating an example method for providing template objects in the exemplary modeling system of FIG. 1.

FIG. 3 is an exemplary flow diagram illustrating a method 300 for model object sharing. Method 300 is described with respect to system 100 of FIG. 1, but method 300 could also be used by any other system. Moreover, system 100 may use any other suitable technique for performing these tasks. Thus, many of the steps in this flowchart may take place simultaneously and/or in different orders as shown. Indeed, while illustrated as occurring in serial, the steps may occur in parallel and/or multiple times without departing from the scope of this disclosure. Moreover, system 100 may use methods with additional steps, fewer steps, and/or different steps, so long as the methods remain appropriate. At a high level, method 300 illustrates two example processes involved in sharing model objects: a generation process (illustrated in steps 302 through 318) and a change propagation process (illustrated in steps 320 through 334).

Method 300 begins at step 302, where template modeling tool 132 is initialized and the generation process begins. Next, at step 304, template modeling tool 132 generates template model 122 including one or more template objects 126. For example, template modeling tool 132 may generate example template domain object 126 and template datatype object 126 of FIG. 2. At step 306, target modeling tool 136 is initialized. Next, at step 308, export engine 134 is initialized in response to a request by target modeling tool 136. At step 310, export engine 134 copies requested template objects 126. Referring to the example, export engine 134 copies template domain object 126 and template datatype object 126. Export engine 134 converts the copy to a form compatible with the target modeling tool 136 at step 312. According to the example, export engine 134 combines template domain object 126 and template datatype object 126 to at least partially generate target domain object 128. After the conversion, export engine 134 tags the copy with a link associating the copy with template objects 126 at step 314. Next, at step 316, target modeling tool 136 generates a target model 124, including one or more target objects 128, based on the copies. If additional target modeling tools are initialized or otherwise request copies of template model 122 at decisional step 318, then execution returns to step 308. If additional target modeling tools 136 are not initialized, then execution proceeds to step 320.

Once one or more copies are generated or converted, any changes to template model 122 are propagated to the copies in steps 320 through 334. At step 320, at least one template object 126 is changed in any appropriate manner using any suitable technique. Referring again to the above example, type property 203 of template data type object 126 may be changed from a value of decimal to a value of integer. In response to the changes to template object 126, export engine 134 identifies or otherwise locates target models 124 including the copy of changed template object 126 based on the tags. At step 324, export engine 134 identifies a first target model 124 including the copy. At step 326, export engine 134 identifies a version of the copy. If the copy needs to be updated at decisional step 328, then, at step 330, export engine 134 updates the copy based on changes to the template object 126. Returning to the example, the value of datatype property 207 of target domain object 128 is changed from "decimal(10,2)" to "integer(10,2)." If no updates are needed at decisional step 328, then execution proceeds to decisional step 332. If additional target models 124 are identified as including the copy of template objects 126 at decisional step 332, then execution returns to step 326. If additional target models 124 are not identified at decisional step 332, then execution proceeds to decisional step 334. If additional changes are made to template object 126 at decisional step 334, then execution returns to step 322. Once the change has propagated to the appropriate target models 124, processing ends.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for model object sharing, comprising:
   selecting a template object from a template model in a modeling repository, the template model generated by a first modeling tool, the template object comprising a template domain object and a template datatype object;
   generating a first copy of the template object;
   converting the first copy to a form compatible with a second modeling tool by combining the template domain object and the template datatype object to at least partially generate a target domain object, the first modeling tool at least partially disparate from the second modeling tool;
   associating the first copy with the selected template object;
   automatically updating the first copy based, at least in part, on changes in the associated template object;
   generating a second copy of the template object;
   converting the second copy to a form compatible with a third modeling tool;
   associating the second copy with the selected template object;
   updating the first copy in a first target model generated by the second modeling tool, based, at least in part, on changes in the template object; and
   updating the second copy in a second target model generated by the third modeling tool, based, at least in part, on changes in the template object.

2. The computer implemented method of claim 1, further comprising generating one or more target models compatible with the second modeling tool, each included target model comprising at least the first copy.

3. The computer implemented method of claim 2, wherein associating the first copy with the template object comprises tagging the first copy with at least one property associating the first copy with the template object.

4. The computer implemented method of claim 3, each property comprising one of the following: a template model identifier, a version of the template model, and a template object identifier.

5. The computer implemented method of claim 3, further comprising:
   changing the template object based on a request from the first modeling tool;

identifying, based on the one or more properties, one or more target models comprising the first copy; and in response to identifying that one of the target models includes the tagged copy, updating each tagged copy based, at least in part, on the changed template object.

6. The computer implemented method of claim 1, further comprising identifying changes to the template object by the first modeling tool.

7. The computer implemented method of claim 1, the model repository comprising a plurality of template models, each template model associated with a unique identifier and version number and comprising a plurality of template objects, each template object comprising a unique object identifier.

8. A computer storage media, storing software for model object sharing, the software configured to:

select a template object from a template model in a modeling repository, the template model generated by a first modeling tool, the template object comprising a template domain object and a template datatype object;

generate a copy of the template object;

convert the first copy to a form compatible with a second modeling tool, the first modeling tool at least partially disparate from the second modeling tool by combining the template domain object and the template datatype object to at least partially generate a target domain object;

associate the first copy with the selected template object;

automatically update the first copy based, at least in part, on changes in the associated template object;

generate a second copy of the template object;

convert the second copy to a form compatible with a third modeling tool;

associate the second copy with the selected template object;

update the first copy in a first target model generated by the second modeling tool, based, at least in part, on changes in the template object; and update the second copy in a second target model generated by the third modeling tool, based, at least in part, on changes in the template object.

9. The computer storage media of claim 8, the software further configured to generate one or more target models compatible with the second modeling tool, each target model comprising at least the first copy.

10. The computer storage media of claim 9, wherein software configured to associate the first copy with the template object comprises software configured to tag the first copy with at least one property associating the first copy with the template object.

11. The computer storage media of claim 10, each property comprising one of the following: a template model identifier, a version of the template model, and a template object identifier.

12. The computer storage media of claim 10, the software further configured to:

change the template object based on a request from the first modeling tool;

identify, based on the one or more properties, one or more target models comprising the first copy; and in response to identifying one of the target models including the tagged copy, update each included tagged copy based, at least in part, on the changed template object.

13. The computer storage media of claim 8, the software further configured to identify changes to the template object by the first modeling tool.

14. The computer-readable storage media of claim 8, the model repository comprising a plurality of template models, each model associated with a unique identifier and version number and comprising a plurality of template objects, each template object comprising a unique object identifier.

15. A system for model object sharing, comprising:

memory storing a plurality of template models, each template model generated by a first modeling tool; and one or more processors configured to:

select a template object from one of the template models, the template object comprising a template domain object and a template datatype object;

generate a copy of the template object;

convert the first copy to a form compatible with a second modeling tool, the first modeling tool at least partially disparate from the second modeling tool by combining the template domain object and the template datatype object to at least partially generate a target domain object;

associate the first copy with the selected template object;

automatically update the first copy based, at least in part, on changes in the associated template object;

generate a second copy of the template object;

convert the second copy to a form compatible with a third modeling tool;

associate the second copy with the selected template object;

update the first copy in a first target model generated by the second modeling tool, based, at least in part, on changes in the template object; and update the second copy in a second target model generated by the third modeling tool, based, at least in part, on changes in the template object.

16. The system of claim 15, the one or more processors further configured to generate one or more target models compatible with the second modeling tool, each target model comprising at least the first copy.

17. The system of claim 16, wherein the one or more processors configured to associate the first copy with the template object comprise one or more processors configured to tag the first copy with at least one property associating the first copy with the template object.

18. The system of claim 17, each property comprising one of the following: a template model identifier, a version of the template model, and a template object identifier.

19. The system of claim 17, the one or more processors further configured to:

change the template object based on a request from the first modeling tool;

identify, based on the one or more properties, one or more target models comprising the first copy; and in response to identifying one of the target models including the tagged copy, update each included tagged copy based, at least in part, on the changed template object.

20. The system of claim 15, the one or more processors further configured to identify changes to the template object by the first modeling tool.

21. The system of claim 15, the model repository comprising a plurality of template models, each model associated with a unique identifier and version number and comprising a plurality of template objects, each template object comprising a unique object identifier.

22. A computer implemented method for model object sharing, comprising:

selecting a template object from a template model in a modeling repository, the template model generated by a first modeling tool, the template object comprising a template domain object and a template datatype object;
generating a copy of the template object;
converting the first copy to a form compatible with a second modeling tool by combining the template domain object and the template datatype object to at least partially generate a target domain object;
tagging the first copy with at least one property for associating the first copy with the template object, the at least one property comprises a template model identifier, a version of the template model, and a template object identifier;
generating one or more models using the second modeling tool comprising at least the first copy;
changing the template object;
searching, based on the at least one property, for models comprising the first copy;
generating a second copy of the template object;
converting the second copy to a form compatible with a third modeling tool;
associating the second copy with the selected template object;
updating the first copy in a first target model generated by the second modeling tool, based, at least in part, on changes in the template object; and
updating the second copy in a second target model generated by the third modeling tool, based, at least in part, on changes in the template object.

* * * * *